United States Patent [19]

Wible

[11] 4,002,220
[45] Jan. 11, 1977

[54] PRIORITY STEER SYSTEM - HYDRAULIC

[75] Inventor: John E. Wible, Painesville, Ohio

[73] Assignee: Towmotor Corporation, Mentor, Ohio

[22] Filed: July 11, 1975

[21] Appl. No.: 595,202

[52] U.S. Cl. .................................. 180/141; 60/422
[51] Int. Cl.² ........................................... B62D 5/08
[58] Field of Search ............. 180/79.2 R, 141, 142, 180/143; 60/413, 404, 422

[56] References Cited
UNITED STATES PATENTS

| | | | |
|---|---|---|---|
| 2,850,879 | 9/1958 | Schnabel | 60/413 |
| 2,875,843 | 3/1959 | Price | 180/79.2 R |
| 2,880,586 | 4/1959 | Lincoln | 60/422 X |
| 2,995,382 | 8/1961 | Heitzman | 180/79.2 R X |
| 3,334,705 | 8/1967 | Lam | 180/79.2 R |
| 3,911,679 | 10/1975 | Matthews | 60/413 |

Primary Examiner—Philip Goodman
Assistant Examiner—R. Schrecengost
Attorney, Agent, or Firm—Phillips, Moore, Weissenberger, Lempio & Strabala

[57] ABSTRACT

A hydraulic system for an electric-powered vehicle, such as a lift truck or the like, supplies pressurized fluid for a hydraulic steering system for the vehicle and for hydraulic motors for manipulating the implements of the vehicle, and includes a priority system for directing all fluid flow from the pump to the steering system circuit until a predetermined minimum pressure is achieved therein, after which fluid is made available to the implement circuit. These are provided in the system for automatically cutting off the electric motor for powering the pump of the system when no demand is made on the hydraulic system.

6 Claims, 1 Drawing Figure

PRIORITY STEER SYSTEM - HYDRAULIC

BACKGROUND OF THE INVENTION

The present invention relates generally to electric-powered vehicles and particularly to a hydraulic system for such vehicles giving priority to the steering system of the vehicle over the implement or work system.

Vehicles such as lift trucks and the like, which are used in warehouses and similarly enclosed areas, are normally electric-powered. The power for such vehicles is normally supplied by storage batteries which are charged when the vehicle is not in use and supply sufficient power for the vehicle to operate over an extended period of time.

Such vehicles normally employ a hydraulic system for the implements of the vehicle such as the lift forks, and in most cases employ a hydraulic powered steering system. The pump for the hydraulic system is normally powered by means of an electric motor separate from the electric motor that powers the vehicle. Because of the extended intervals of time in which the implements of the vehicle may not be in use, a system is provided for automatically cutting off the motor of the hydraulic system of the vehicle when not in use in order to conserve electric power of the storage batteries. However, vehicles having power steering, when in operation, require almost constant and frequent minor corrections in the steering of the vehicle. For this reason a substantially constant supply of fluid for the steering system is essential.

Also, because of the different pressure requirements between the implement circuit and the steering circuit, a problem exists when the same circuit or source of fluid is utilized for both systems. Separate systems are impractical because of the cost involved and because of the required space on the vehicle for such a separate system.

Another problem with such systems is arranging the system to provide a ready availability of pressure for either of the implement or the steering circuit on demand. The main problem is providing a system wherein fluid is readily available for the steering system and wherein neither of the systems that is, the steering circuit or the implement circuit, will interfere with one another. When circuits having systems such as a power steering system and an implement manipulation system are supplied with pressure from the same hydraulic system, because of the diverse requirements of the system they may generally interfere with one another.

SUMMARY AND OBJECTS OF THE INVENTION

It is the primary object of the present invention to overcome the above deficiencies of the prior art.

Another object of the present invention is to provide a hydraulic system for supplying a power steering circuit and an implement circuit wherein the implement circuit does not interfere with the operation of the steering circuit.

A further object of the present invention is to provide a hydraulic system for an electric-driven vehicle wherein the power steering system of the vehicle has priority over the implement system of the vehicle.

Still another object of the present invention is to provide an electric-powered vehicle with a hydraulic system having means to supply pressurized fluid for steering the vehicle without requiring a constant starting and stopping of the electric motor for powering the hydraulic system.

In accordance with the primary aspect of the present invention, an electrically powered vehicle is provided with a single hydraulic system for powering implements of the vehicle as well as powering the steering of the vehicle wherein means are provided for giving a priority of the steering circuit of the vehicle over the implement circuit of the vehicle.

BRIEF DESCRIPTION OF THE DRAWING

The above and other objects and advantages of the present invention will become apparent from the following description when read in conjunction with the drawing, wherein the single sheet of drawing is a schematic layout of a hydraulic system embodying the present invention.

DETAILED DESCRIPTION OF A PREFERRED EMBODIMENT

Figure 1:
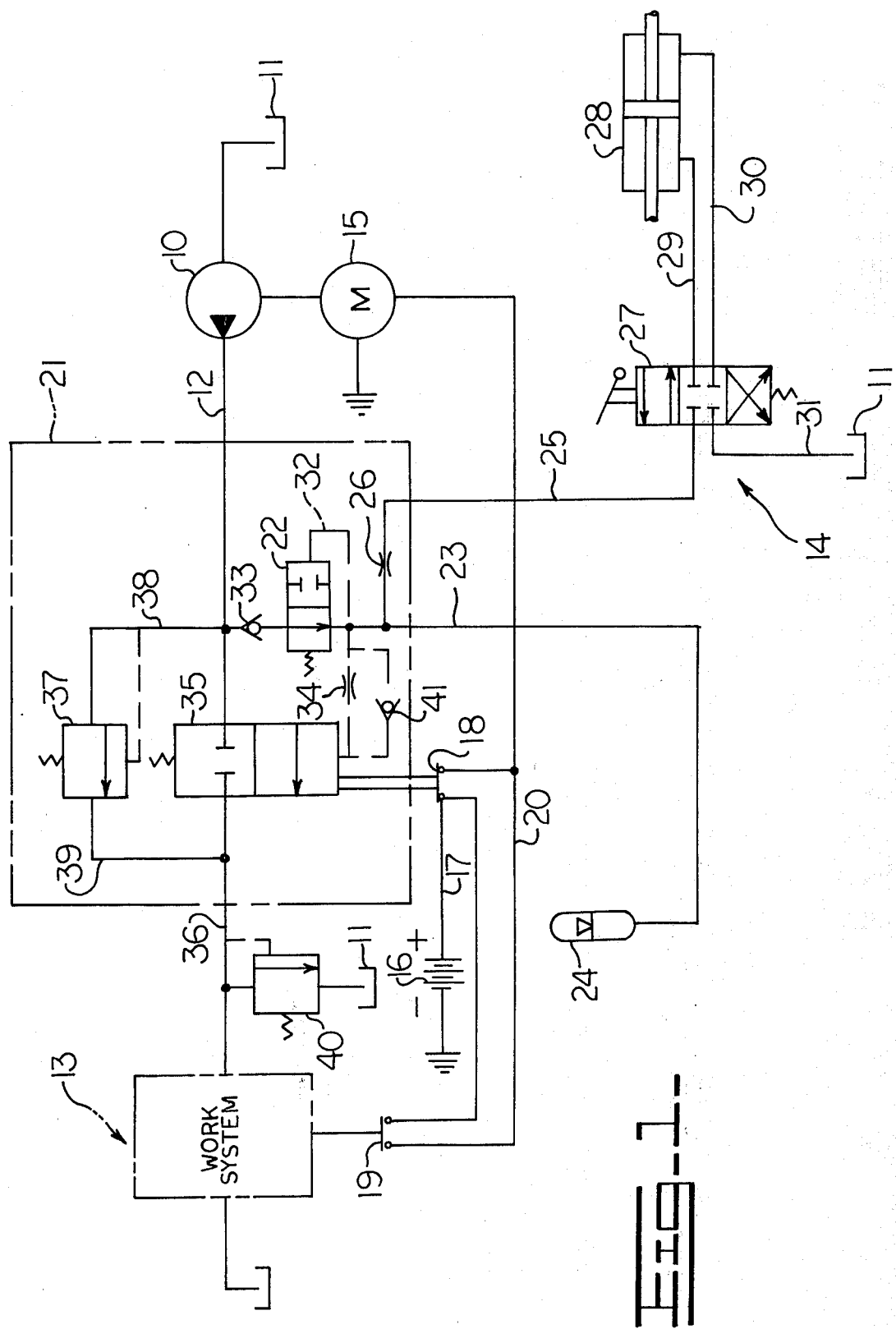

Turning now to the drawing, a hydraulic system for an electric-powered vehicle comprises a suitable source of hydraulic fluid comprising a pump 10 which draws fluid from a tank or reservoir 11 and supplies it by a main supply line or conduit 12 to a hydraulic system including an implement circuit indicated generally at 13 and a vehicle steering circuit indicated generally at 14.

The pump 10 is driven by a suitable electric motor 15 which is preferably separate from the vehicle propulsion motor but which may be generally run from the same batteries. This system is for an electric-powered vehicle wherein the source of electric power is storage batteries or the like and it is necessary to conserve energy as much as possible. Power for the motor 15 is supplied by a suitable electric power source such as a battery 16 connected by suitable conductor means 17 within a circuit for supplying electric power to the motor 15. The circuit includes a first switch means 18 operated by a priority and pressure sensing valve system to be described, and a second switch 19 operated by the implement system valves for completing the circuit for conducting electrical power from the battery 16 by way of a conductor 20 to the motor 15.

The pump 10 supplies pressurized fluid along conduit 12 to a priority valve and pressure sensing group 21 comprising a first valve 22 which is pressure-responsive and is operative in a normal position to direct fluid along a passage or conduit 23 to an accumulator 24 for accumulating and storing a quantity of pressurized fluid sufficient to operate a steering system for a significant number of times or cycles. This valve 22 functions to isolate steering system pressure from implement working pressure when the pressure exceeds 1300 psi. A conduit 25, including a restriction 26, communicates with conduit 23 and to a steering valve 27. The steering valve 27 is operative in a position as shown, which is a neutral position to block the fluid flow along conduit 25 and is operative in either one of two positions to either side of the neutral position to direct fluid to either side of the double-acting hydraulic motor 28 for steering the vehicle. The valve is operative to direct fluid to the motor 28 along one conduit 29 to one side of the motor while at the same time directing the fluid from the other conduit 30 from the other side of the motor along a return line 31 to the tank 11.

The valve 22 includes a pilot line 32 for communicating pressure from the line 23 to actuate the valve 22 to a blocking position when a predetermined maximum acceptable pressure has been reached in the steering system. The fluid directed through valve 22 is available to either one of the accumulator 24 or the steering valve 27.

A check valve 33 is included within the inlet passage leading to valve 22 to retain the pressure within the steering circuit. When a certain predetermined maximum pressure of approximately 1300 psi is reached within the steering circuit, valve 22 shifts to the blocking position blocking the fluid within that circuit. Prior to this event, fluid pressure from pump 10 is communicated by a pilot line 34 having metering or restriction means to actuate second valve 35 to the open position to provide communication between the supply line 12 and a conduit 36 for supplying pressurized fluid to the implement system of the vehicle. A check valve 41 permits substantially free flow in one direction to permit rapid return of valve 35 for pump start up and charging. A third valve 37 is responsive to a predetermined pressure within the supply line 12 and particularly a branch line 38 supplied thereto to shift to an open position and direct fluid along the branch 38 and line 39 to the supply line 36 for the vehicle implement system. This valve 37 would be shifted before valve 22 as it is open to communicate fluid to the implement system between 600 psi and 1100 psi. Being time dependent, the upper limit is not clearly defined, however, valve 37 is set at 1100 psi and would prevent over pressurization when the implement system is not in operation. A pressure relief valve 40 is provided within the implement system to relieve excess pressure therein from the system to the tank 11.

The implement system may include, for example the forks and tilt cylinders of a lift truck and include any number of valves for directing fluid from along conduit 36 to either one of the lift or tilt cylinders of the system.

The implement system per se forms no part of the present invention and thus will not be described in detail. The system, however, will include any number of valves and having means thereon for engaging or otherwise actuating one or more electrical switches such as 19 when the valve is shifted for the purposes of starting the motor 15 for supplying fluid thereto when such fluid is demanded by the implement system. These valves may preferably be open centered valves.

Thus, with this system it will be seen that priority of the fluid is to the steering system of the vehicle. Thereafter, fluid is made available to the implement system. In other words, fluid, prior to a certain predetermined minimum pressure, is directed exclusively to the steering system, which includes, of course, the accumulator 24. Thereafter, fluid is directed either by means of second valve 35 or third valve 37 to the implement system 13 for use therin.

The valve 35, as previously described, is pressureresponsive to pressure within the steering system to shift to the open position for directing fluid to the implement or work system. Once this valve shifts, however, to that position, it deactivates switch 18 such that motor 15 will stop unless one of the valves of the work system 13 is actuated to a position to close a switch such as 19 for starting or maintaining the motor 15 in a running position. When the pressure within the steering system falls below a predetermined minimum, the valve 35 will shift back to the closed position and simultaneously actuate the switch 18, thus starting the motor 15 for pumping fluid to the system and lending priority to the steering circuit.

While the present invention has been described by means of preferred embodiment, it is to be understood that changes and modifications can be made therein without departing from the spirit and scope of the invention as defined in the appended claims.

I claim:

1. A hydraulic steering system for an electric-powered vehicle comprising in combination:
   a hydraulic pump;
   means for driving said pump including an electric motor and a source of electric power including a circuit for said electric motor;
   steering motor means;
   implement motor means;
   steering circuit means including accumulator means for selectively directing hydraulic fluid for powering said steering motor means;
   implement circuit means including control means for selectively directing hydraulic fluid for powering said implement motor means;
   priority means including first valve means for normally communicating fluid from said source to said accumulator means and responsive to a predetermined maximum pressure in said steering circuit to block said communication; and,
   second valve means for normally blocking communication of fluid from said source to said implement system for establishing a priority of fluid to said steering circuit means and responsive to a predetermined pressure in said steering circuit to communicate fluid from said source to said implement circuit.

2. The hydraulic system of claim 1 including third valve means responsive to a predetermined maximum pressure of said source for communicating fluid from said source to said implement circuit.

3. The system of claim 2 wherein said priority means includes pressure-responsive valve means for directing fluid from said source exclusively to said steering circuit means until said accumulator means is charged to a predetermined minimum pressure.

4. A hydraulic steering system for an electric-powered vehicle comprising in combination;
   a hydraulic pump;
   means for driving said pump including an electric motor and a source of electric power including a circuit for said electric motor;
   steering motor means;
   implement motor means;
   steering circuit means including accumulator means for selectively directing hydraulic fluid for powering said steering motor means;
   implement circuit means including control means for selectively directing hydraulic fluid for powering said implement motor means;
   priority means including pressure responsive valve means for directing fluid from said source exclusively to said steering circuit means until said accumulator means is charged to a predetermined maximum pressure, for establishing a priority of fluid to said steering circuit means; and,
   means for automatically interrupting said source of electrical power upon failure of demand for fluid from said source from both of said steering circuit means and said implement circuit means.

5. The hydraulic system of claim 4 wherein said priority means includes first valve means for normally communicating fluid from said source to said accumulator means and responsive to a predetermined maximum pressure in said steering circuit to block said communication; and, second valve means for normally blocking communication of fluid from said source to said implement system and responsive to a predetermined minimum pressure in said steering circuit to communicate fluid from said source to said implement circuit.

6. The hydraulic system of claim 5 including third valve means responsive to a predetermined maximum pressure of said source for communicating fluid from said source to said implement circuit.

* * * * *